United States Patent Office

Re. 27,531
Reissued Dec. 12, 1972

27,531

AMYLOSE COATED, FRIED POTATO PRODUCT AND PROCESS FOR PREPARING THE SAME

Daniel G. Murray, Muscatine, Iowa, and Nicholas G. Marotta, Green Brook, and Richard M. Boettger, Morristown, N.J., assignors to National Starch and Chemical Corporation, New York, N.Y.

No Drawing. Original No. 3,597,227, dated Aug. 3, 1971, Ser. No. 718,356, Apr. 3, 1968, which is a continuation-in-part of applications Ser. No. 412,818 and Ser. No. 412,843, Nov. 20, 1964, both now abandoned. Application for reissue Oct. 4, 1971, Ser. No. 186,505

Int. Cl. A23l *1/12*

U.S. Cl. 99—100 P 4 Claims

Matter enclosed in heavy brackets [ ] appears in the original patent but forms no part of this reissue specification; matter printed in italics indicates the additions made by reissue.

ABSTRACT OF THE DISCLOSURE

A process for preparing deep fried potato products, including potato chips, french fried potatoes, and specialty products which are all characterized by their improved quality and the products thus produced; said process comprising the coating of such potato products, prior to the deep frying thereof in a hot cooking oil, with an aqueous dispersion of a high amylose starch or the amylose fraction resulting from the separation of whole starch into its amylose and amylopectin components.

RELATED APPLICATIONS

This application is a continuation-in-part of our copending applications Ser. Nos. 412,818 and 412,843, now abandoned, both filed on Nov. 20, 1964 and assigned to the assignee of the subject application.

BACKGROUND OF THE INVENTION

This invention relates to the process of coating deep fried potato products as well as to the improved coated potato products thereby obtained. More particularly, this invention relates to the use of a novel class of coating materials which are applied to potato products prior to their being deep fried.

As is well known in the art, sliced raw potatoes or reconstituted raw potatoes are often used for the preparation of a wide variety of deep fried products, i.e. products which are cooked by being immersed in a hot, edible cooking oil. Such products include, for example, potato chips, french fried potatoes, potato crackers, potato pancakes and a number of so called "specialty" fried potato products prepared from slivers and odd shaped pieces of potatoes which are reconstituted, i.e. compressed, into the shape of rods or balls and which are then deep fried. The latter specialty fried potato products as well as french fried potatoes and potato pancakes are often frozen subsequent to their being deep fried and are thereupon sold to the ultimate user in frozen form.

All of these deep fried potato products have in common with one another the fact that it is highly desirable that they possess certain properties relating to their appearance, texture and taste characteristics. Thus, for example, deep fried potato products should be exceedingly crisp and should be able to remain crisp over a prolonged period of storage. They should have strength and rigidity without being tough. They should, of course, have an appealing flavor. As little oil as possible should be absorbed during their cooking and variations in the amount of oil absorbed should be reduced to a minimum. Color variations should also be reduced to a minimum and, of course, the shelf life of these products should be the maximum which is attainable.

With regard to those deep fried potato products which are frozen subsequent to their preparation, many of the above described properties are again applicable and, in addition, it is also important that they have good stability under frozen storage. Finally, it may be noted that the specialty fried potato products have certain particular requirements of their own which include the need for the formation of a hard outer skin, or "case" as it is often referred to, as well as for a minimum amount of shrinkage of the core of the product away from the case subsequent to the deep frying operation.

Present means of produtcion provide very few, if any, safeguards or special measures which are designed to insure the attainment of the above described properties in deep fried potato products. For example, prior to being deep fried and frozen, fresh fried potatoes are often blanched in an aqueous calcium lactate solution. The calcium lactate reacts with the pectin contained by the potato to form the water insoluble calcium pectates so as to thus effect a toughening of the potato. They are then sometimes blanched in aqueous solutions of methyl cellulose or a natural gum, such as an alginate, for the purpose of increasing their crispness. It is to be noted, however, that none of the latter treatments provides fully acceptable results.

Thus, it is seen that, for the most part, the commercial preparation of deep fried potato products is not completely satisfactory with regard to providing these products with desirable characteristics of appearance, texture and taste.

It is, therefore, the prime object of this invention to provide a novel class of coating materials for application to potato chips, french fried potatoes and specialty potato products prior to their being deep fried; the latter coating materials serving to enhance the appearance, texture and taste characteristics of the resulting deep fried potato products. Various other objects and advantages of this invention will be apparent from the description thereof, which follows hereinafter.

DETAILED DESCRIPTION OF THE INVENTION

It is well known that starch is composed of two fractions, the molecular arrangement of one being linear and the other being branched. The linear fraction of starch is known as amylose and the branched fraction as amylopectin. Methods for separating starch into these two components are known. Starches from different sources, e.g. potato, corn, tapicoa, and rice, etc., are characterized by different relative proportions of the amylose and amylopectin components. Some starches have been genetically developed which are characterized by a large preponderance of the one fraction over the other.

When we use the term "amylose" or "amylose product" for the purposes of this invention, we refer to the amylose resulting from the fractionation of whole starch into its respective amylose and amylopectin components, or to whole starch which is composed of at least 55%, by weight, of amylose. The amylose may be further treated as with heat and/or acids or with oxidizing agents to form so called thin boiling products. Or, the amylose may be chemically derivatized, as by means of an esterification reaction which would thus yield amylose esters such, for example, as the acetate, propionate, and butyrate; or, by means of an etherification reaction which would thus yield amylose ethers such, for example, as the hydroxyethyl, hydroxypropyl, carboxymethyl or benzyl.

We have now discovered that the use of amylose, as defined hereinabove, as a coating material for potatoes and specialty potato products which are to be subjected to deep frying results in the preparation of deep fried potato products which display excellent properties of appearance, texture and taste.

As will be seen, hereinbelow, our novel process involves the coating of deep fried potato products, prior to the deep frying operation, with an amylose product which is an extraneously added ingredient. In other words, the amylose coating is a separately added ingredient and is not obtained, in situ, by means of a process which leaches or otherwise extracts the amylose from the naturally occurring starch content of either the potato slices or of the compressed potato fragments which are being subjected to the coating process of this invention.

In comparison with conventionally prepared products, the amylose coated, deep fried potato products resulting from the novel process of our invention are all characterized by their high degree of crispness which is retained for prolonged periods. They have superior strength and rigidity and are therefore resistant to breakage while being devoid of any objectionable toughness. They absorb less oil during the cooking process while variations in the amount of oil which is absorbed are reduced to a minimum. They show a minimum degree of color variation, their taste is excellent and their shelf life is substantially better than average. In addition, those coated potato products of our invention which are frozen subsequent to their preparation display good stability under frozen storage.

In conducting the novel process of our invention, the selected amylose product is first suspended in water in a concentration of from about 1 to 15%, by weight. The aqueous amplose suspension is then heated at a temperature of at least about 180° F. for a period of about ½ to 60 minutes until the amylose product has been completely dispersed, i.e. gelatinized, so as to result in the formation of a colloidal dispersion. The precise combination of time and temperature which are required will, of course, vary according to the particular amylose product whose dispersal is desired.

Prior to the actual coating of the raw potato slices which are to be used for the preparation, for example, of potato chips, french fried potatoes or other deep fried products which may be prepared from raw, sliced potatoes, the slices are usually washed in order to remove excess starch as well as to prevent their adhering to one another during the subsequent deep frying operation. Excess water may be removed with a sponge rubber roller or by subjecting the slices to a hot air blast. It is to be noted that, in all cases, the natural starch content of the potato slices or of the compressed, raw potato fragments which are used in the subject process will be completely ungelatinized prior to the time they are subjected to the deep frying operation, i.e. the cooking in a hot, edible cooking oil.

The thickness of the slices used for preparing potato chips will, of course, be substantially less than the thickness of the slices used to prepare french fried potatoes wherein it is desirable that the finished product have a soft, pulpy interior. Thus, since potato chips are always prepared so as to have an essentially flat, sheet-like structure which is devoid of any massive bulk comprising a soft pulpy interior, the raw potato slices to be used in their preparation should have a thickness of no more than about 0.02 to 0.2 of an inch.

The raw slices are then immersed in the amylose dispersion while the latter is being maintained at a temperature in the range of from about 100 to 210° F. The concentration of amylose product in the dispersion is, as noted above, at about 1 to 15%, by weight. The immersion of the raw potato slices is best accomplished by either passing them through a dip tank, by mechanical means, or by spraying the slices from both above and below while they are being conveyed upon a mesh belt. The slices are then allowed to drain for from about 1 second to 10 minutes. In some cases, the coated slices may be subjected to either a warm air blast or to a cold water dip in order to remove excess amylose. The coated slices are then subjected to the conventional deep frying process whereby they are immersed in an edible cooking oil such, for example, as cottonseed, corn, coconut, soy, or any mixtures of the latter oils, and cooked for about 1 to 5 minutes at a temperature in the range of from about 300 to 400° F. Here again, the precise combination of time and temperature which is utilized for the deep frying operation will, of course, depend upon the particular deep fried product which is being prepared as well as on the oil being utilized.

It should be noted that when french fried potatoes are being prepared, the raw potato slices may be given a calcium lactate blanch, or any other desired treatment, prior to their being coated in the hot amylose dispersion. However, the novel amylose coatings employed in the process of our invention do, of course, eliminate the need for blanching the slices in methyl cellulose or in natural gums which, as noted above, are sometimes employed in a generally unsuccessful attempt to improve crispness.

The preparation of specialty fried potato products by means of the process of our invention differs, in some respects, from the above described procedure which is utilized for the coating of potato chips, french fried potatoes or similar products which are prepared from raw, sliced potatoes. Thus, with regard to these specialty products, the preferred embodiment of our invention involves the intimate admixture of the selected amylose product with the various slivers and other odd shaped raw fragments or scraps, which are utilized therein, prior to their being reconstituted, via compression, into the form of pieces or solid units having the desired shape.

Various other materials may also, if desired, be admixed with the potato scraps together with the amylose product. Thus, such materials as wheat, corn or potato flour and conventional, i.e. low amylose, starches can be used in order to assist in the formation of the product and to provide a good case therefor. However, it should be noted that none of the latter materials is completely satisfactory if employed in the absence of an amylose product, as taught by our novel process, since their use nonetheless results in specialty products displaying such defects as poor case, unevenness in color, and roughness in texture. On the other hand, one can dispense with all of these other materials and use only an amylose product while still being able to produce specialty fried potato products displaying an excellent array of properties. Conventional seasoning materials such as salt, pepper and monosodium glutamate can, of course, be included in the mixtures used in preparing these specialty products according to the process of our invention.

Thus, the process of our invention, with respect to its optimum mode of application in the preparation of specialty fried potato products which are prepared by the compression of odd shaped potato scraps, cannot be said to involve a "coating" process in the usual meaning of the latter term. However, inasmuch as an amylose product will be intimately admixed throughout the mass of the resulting shaped potato piece, it will also, therefore, be evenly distributed over its outer surface. Thus, the overall effect is, in a sense, quite similar to that of a typical coating process and will be considered as such for the purposes of this description.

Moreover, it should be noted that, if desired, it is possible to prepare specialty fried potato products by means of a conventional coating process similar to that described above for the preparation of French fried potatoes. Thus, one can immerse the shaped potato product, which may or may not contain an amylose product intimately dispersed therein, into a heated, aqueous dispersion of an amylose product prior to the deep frying operation.

In any event, by following the above described preparative procedures, the deep fried potato products resulting from the process of this invention will [contain or] be coated with from about 0.002 to 0.02% by weight, of an amylose product as based upon the weight of the deep fried potato product less the weight of the coating or internally added amylose.

It is also to be pointed out, that under no circumstances are the novel amylose coated, deep fried potato products of this invention ever prepared so as to contain any extraneously added water as an internal constitutent thereof.

Moreover, it is to be appreciated that the peculiar nature of these novel, amylose coated deep fried potato products makes it necessary, in many instances, to describe them in terms of the particular process steps utilized in their preparation.

EXAMPLE I

This example illustrates the preparation of French fried potatoes which have been coated with an amylose product according to the novel process of our invention.

Potatoes which had been stored at about 45° F. in order to reduce the formation of reducing sugars were washed, peeled, trimmed and then cut into slices having the shape of rectangular solids whose average dimensions were about ½" x ½" x 3". The slices were then washed to remove excess starch.

The slices were placed in a wire mesh basket which was then immersed for one minute in a vessel filled with a 6%, by weight, aqueous dispersion of amylose acetate which was at a temperature of 185° F. The latter amylose acetate had a D.S., i.e. a degree of substitution, of 2.5 and had been prepared by the reaction of acetic anhydride with a sample of high amylose corn starch having an amylose content of 55%, by weight.

After being removed from the hot, aqueous dispersion of amylose acetate, the coated slices were drained for one minute whereupon they were deep fried, for about two minutes, in cottonseed oil which was at a temperature of about 380° F. The thus fried potatoes were drained for 1½ minutes and were then quick frozen at a temperature of about −30° F.

Upon being reheated, the french fried potatoes were found to have good flavor and were exceedingly crisp while displaying excellent strength without being tough. It was also noted that variations in color as well as in the amount of oil which had been absorbed were minimal.

In a repetition of the above described procedure, french fries displaying comparable properties were prepared using a variety of different amylose coating products in place of the amylose acetate described hereinabove. The amylose products thus employed are listed below:

(1) A high amylose corn starch having an amylose content of 55%, by weight.

(2) A high amylose corn starch having an amylose content of 70%, by weight.

(3) Amylose derived from the fractionation of potato starch.

(4) An acetate ester of amylose having a D.S. of 2.0, as prepared by the reaction of acetic anhydride with a sample of amylose derived from the fractionation of potato starch.

(5) A hydroxypropyl ether of amylose having a D.S. of 1.5, as prepared by the reaction of propylene oxide with a sample of high amylose corn starch having an amylose content of 70%, by weight.

(6) A thin boiling amylose product prepared by the treatment, with sodium hypochlorite, of a sample of high amylose corn starch having an amylose content of 65%, by weight; the final product having been converted to a degree known in the trade as 70 fluidity.

EXAMPLE II

This example illustrates the use of the novel process of this invention for the preparation of a typical specialty fried potato product having an amylose product intimately dispersed therein as well as on its outer surface.

The following materials were intimately admixed and then compressed into rod shaped pieces having an average length of 2 inches and an average diameter of 0.75 inch:

| | Parts |
|---|---|
| Amylose acetate (as described in Example I) | 3.0 |
| Potato scraps | 1000.0 |
| Salt | 5.0 |
| Pepper | 0.12 |
| Monosodium glutamate | Trace |

Subsequent to the compression of the latter materials, the resulting rod shaped pieces were dropped into a vessel containing cottonseed oil which was at a temperature of 350° F. and cooked therein for a period of 1½ minutes. The thus fried pieces were drained for about 1½ minutes and then quick frozen at a temperature of −30° F.

Upon being reheated, these rod shaped pieces were found to have a desirably hard case from which the respective interiors of the pieces had not pulled or shrunk away. They also displayed a minimal amount of color variations as well as an excellent flavor.

EXAMPLE III

This example illustrates the preparation of potato chips which have been coated with an amylose product according to the novel process of our invention.

Potatoes which had been stored at about 45° F. in order to reduce the formation of reducing sugars were washed, peeled, trimmed and then cut into approximately round slices having an average diameter of about 2½ inches and an average thickness of 0.05 inch. Excess water and starch were removed by subjecting the slices to a hot air blast.

The slices were placed in a wire mesh basket which was immersed for 1 minute in a vessel filled with a 6.0%, by weight, aqueous dispersion of amylose acetate which was at a temperature of 185° F. The amylose acetate utilized had a D.S., i.e. degree of substitution, of 2.5 and had been prepared by the reaction of acetic anhydride with a sample of high amylose corn starch having an amylose content of 55%, by weight. After being removed from the hot, aqueous amylose acetate dispersion, the thus coated slices were drained for about one minute whereupon they were deep fried for about five minutes in cottonseed oil which was at a temperature of about 325–375° F. After being fried, the chips were salted with finely ground salt at a rate of approximately 4 parts of salt per 100 parts of chips resulting in a final salt content, on the part of the finished chips, which was in the order of about 1.25 to 2.75, by weight.

As prepared by means of the above described procedure, the resulting potato chips were found to be exceedingly crisp both when fresh as well as after prolonged storage. They were strong and rigid without being tough and had excellent flavor. It was also noted that variations in oil pickup were minimal.

In a repetition of the above described procedure, potato chips displaying comparable properties were prepared using a variety of different amylose coating products in place of the amylose acetate described hereinabove. The amylose products thus employed are listed below:

(1) A high amylose corn starch having an amylose content of 55%, by weight.

(2) A high amylose corn starch having an amylose content of 70%, by weight.

(3) Amylose derived from the fractionation of potato starch.

(4) An acetate ester of amylose having a D.S. of 2.0, as prepared by the reaction of acetic anhydride with a sample of amylose derived from the fractionation of potato starch.

(5) A hydroxypropyl ether of amylose having a D.S. of 1.5, as prepared by the reaction of propylene oxide with a sample of high amylose corn starch having an amylose content of 70%, by weight.

(6) A thin boiling amylose product prepared by the treatment, with sodium hypochlorite, of a sample of high amylose corn starch having an amylose content of 65%, by weight; the final product having been converted to a degree known in the trade as 70 fluidity.

EXAMPLE IV

This example illustrates the preparation of the novel coated potato chips of this invention whereby a variety of amylose products were utilized as coating materials.

A taste panel having 12 members was presented with fresh samples, as well as with two week old samples, of potato chips prepared by means of the process described in Example III, hereinabove, using a variety of amylose products as coating materials therefor. As a control, the panel was also presented with both fresh and two week old samples of potato chips which had been prepared by means of a process whereby the raw slices had not been coated with an amylose product but had, rather, merely been blanched with water which was at a temperature of 185° F.

The results of this crispness evaluation are presented in the following table. These results are expressed on a numerical scale of from 0 to 10 wherein a rating of zero is indicative of a soggy, limp chip whereas a rating of 10 denotes an exceedingly crisp chip.

| Coating material | Rating of— | |
|---|---|---|
| | Fresh sample | Two week old sample |
| Control (blanched with water at 180° F.) | 5 | 3+ |
| Acetate ester of high amylose corn starch (as described in Example I) | 8 | 7 |
| High amylose corn starch containing 55%, by weight, of amylose | 6 | 5 |

The results obtained in the above described evaluation are clearly indicative of the superior crispness which is attained in those potato chips which have been coated with an amylose product according to the novel process of this invention.

Summarizing, the novel process of this invention may thus be said to result in the preparation of deep fried potato products having vastly improved properties as compared with the results heretofore attainable. Variations may be made in proportions, procedures and materials without departing from the scope of this invention which is limited only by the following claims.

What is claimed is:

1. In the process of preparing deep fried potato slices characterized by their improved appearance, texture and taste, said process consisting essentially of subjecting raw, sliced potatoes to cooking in an edible, hot cooking oil, the improvement which comprises the step of coating the entire surface of said raw potatoes with an extraneously added amylose product prior to the cooking in said edible, hot cooking oil; said amylose product being selected from the group consisting of amylose resulting from the fractionation of whole starch and whole starch containing at least 55%, by weight, of amylose, and being present in an amount such that the deep fried potato slice is coated with from about 0.002% to 0.02% of the amylose product, based on the weight of the deep fried potato slice.

2. In the process of preparing fried reconstituted potato products which are characterized by their improved appearance, texture and taste, said process comprising cooking solid units of compressed fragments of raw potatoes in a hot, edible, cooking oil, the improvement which comprises the step of intimately dispersing an extraneously added amylose product throughout the mass of raw potato fragments prior to their compression into solid units and subsequently cooking said raw potato fragments in said hot, edible, cooking oil, said potato fragments comprising a major portion of said fried potato product; said amylose product being selected from the group consisting of amylose resulting from the fractionation of whole starch and whole starch containing at least 55%, by weight, of amylose, and being present *on the surface of said fried reconstituted potato product* in a [total] concentration of from 0.002% to 0.02%, based on the weight of the deep fried potato product.

3. A deep fried potato slice characterized by its improved appearance, texture and taste, said deep fried potato slice having been fried in a raw state and having a coating of an extraneously added amylose product over its entire surface area, said amylose product being selected from the group consisting of amylose resulting from the fractionation of whole starch and whole starch which contains at least 55%, by weight, of amylose, and being present in an amount such that the deep fried potato slice is coated with from about 0.002% to 0.02% of the amylose product, based on the weight of the deep fried potato slice.

4. A deep fried reconstituted potato product characterized by its improved appearance, texture and taste, said fried potato product comprising a major portion of compressed raw potato fragments having been fried in a raw state and having an extraneously added amylose product intimately dispersed throughout its mass and coated over its surface area, said amylose product being selected from the group consisting of amylose resulting from the fractionation of whole starch and whole starch which contains at least 55%, by weight, of amylose and being present *on the surface of said fried reconstituted potato product* in a [total] concentration of from about 0.002% to 0.02%, based on the weight of the deep fried potato product.

References Cited

The following references, cited by the Examiner, are of record in the patented file of this patent or the original patent.

UNITED STATES PATENTS

| | | | |
|---|---|---|---|
| 2,856,295 | 10/1958 | Scharf | 99—100 |
| 2,909,435 | 10/1959 | Watters | 99—168 |
| 3,027,258 | 3/1962 | Markakes | 99—207 |
| 3,122,534 | 2/1964 | Muetgeert | 99—168 |
| 3,175,914 | 3/1965 | Vahlsing | 99—100 |
| 3,259,503 | 7/1966 | Tan | 99—100 |
| 3,368,909 | 2/1968 | Moore | 99—168 |
| 3,396,036 | 8/1968 | Liepa | 99—100 |
| 3,407,070 | 10/1968 | Murray | 99—100 |
| 3,424,591 | 1/1969 | Gold | 99—168 |
| 3,425,848 | 2/1969 | Camirand | 99—168 |
| 3,427,951 | 2/1969 | Mitan | 99—166 |
| 3,479,191 | 11/1969 | Cole | 99—168 |
| 3,489,575 | 1/1970 | Johnson | 99—100 |
| 3,210,193 | 10/1965 | Martin | 99—100 |
| 3,208,851 | 9/1965 | Antinon | 99—100 |

NORMAN YUDKOFF, Primary Examiner

M. G. MULLEN, Assistant Examiner

U.S. Cl. X.R.

99—168